(12) United States Patent
Kwak et al.

(10) Patent No.: US 9,569,088 B2
(45) Date of Patent: Feb. 14, 2017

(54) SCROLLING METHOD OF MOBILE TERMINAL

(75) Inventors: Woo-Young Kwak, Gyeonggi-Do (KR);
Seung-Jun Lee, Seoul (KR); So-Young Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1233 days.

(21) Appl. No.: 12/230,623

(22) Filed: Sep. 2, 2008

(65) Prior Publication Data
US 2009/0070711 A1  Mar. 12, 2009

(30) Foreign Application Priority Data

Sep. 4, 2007 (KR) .......... 10-2007-0089670
Sep. 4, 2007 (KR) .......... 10-2007-0089686

(51) Int. Cl.
| | | |
|---|---|---|
| G06F 3/0488 | (2013.01) | |
| G06F 3/0485 | (2013.01) | |
| H04M 1/725 | (2006.01) | |
| G06F 3/01 | (2006.01) | |
| G06F 3/0482 | (2013.01) | |
| H04M 1/2745 | (2006.01) | |

(52) U.S. Cl.
CPC .......... *G06F 3/0488* (2013.01); *G06F 3/0485* (2013.01); *G06F 3/016* (2013.01); *G06F 3/0482* (2013.01); *H04M 1/274525* (2013.01); *H04M 1/72583* (2013.01); *Y10S 715/973* (2013.01)

(58) Field of Classification Search
CPC .................................................. G06F 3/04812
USPC ................................................. 715/829, 784
See application file for complete search history.

(56) References Cited

U.S. PATENT DOCUMENTS

| | | | | |
|---|---|---|---|---|
| 5,283,841 | A * | 2/1994 | Yamada ................. | 382/162 |
| 6,128,012 | A * | 10/2000 | Seidensticker et al. ...... | 345/685 |
| 6,219,032 | B1* | 4/2001 | Rosenberg ............. | A63F 13/06 |
| | | | | 345/157 |
| 6,300,967 | B1* | 10/2001 | Wagner et al. ........... | 715/784 |
| 6,366,302 | B1* | 4/2002 | Crosby ........... | H04M 1/274525 |
| | | | | 715/783 |
| 6,469,720 | B1* | 10/2002 | Ringot .................. | 715/829 |
| 6,489,951 | B1* | 12/2002 | Wong et al. ............ | 345/173 |
| 6,496,182 | B1* | 12/2002 | Wong et al. ............ | 345/173 |
| 6,683,626 | B1* | 1/2004 | Abellera ................ | 715/785 |
| 6,701,525 | B1* | 3/2004 | Neervoort et al. ......... | 725/38 |
| 7,362,312 | B2* | 4/2008 | Nurmi ................... | 345/169 |
| 7,362,331 | B2* | 4/2008 | Ording ................... | 345/473 |
| 7,469,381 | B2* | 12/2008 | Ording ................... | 715/702 |
| 7,546,317 | B1* | 6/2009 | Kaptelinin ............... | 705/6 |

(Continued)

FOREIGN PATENT DOCUMENTS

| | | |
|---|---|---|
| CN | 101027629 A | 8/2007 |
| EP | 0 971 285 A2 | 1/2000 |

(Continued)

*Primary Examiner* — Jeffrey A Gaffin
*Assistant Examiner* — John M Heffington
(74) *Attorney, Agent, or Firm* — Birch, Stewart, Kolasch & Birch, LLP

(57) ABSTRACT

A mobile terminal having a touch screen or a touch pad is disclosed. In a user environment, when a displayed menu list is moved according to a flicking operation, a feedback indicating the reaching of the end (the last item) of the menu list is issued in a visible, audible or tactile manner to a user, thereby increasing the user convenience of menu searching and the durability of the mobile terminal.

14 Claims, 13 Drawing Sheets

(56) References Cited

U.S. PATENT DOCUMENTS

| | | | | |
|---|---|---|---|---|
| 7,710,393 B2* | 5/2010 | Tsuk et al. | | 345/156 |
| 7,786,975 B2* | 8/2010 | Ording et al. | | 345/156 |
| 7,786,999 B1* | 8/2010 | Reid | | 345/581 |
| 7,800,618 B1* | 9/2010 | Westen | | 345/473 |
| 7,844,915 B2* | 11/2010 | Platzer et al. | | 715/781 |
| 7,872,652 B2* | 1/2011 | Platzer et al. | | 345/473 |
| 7,903,115 B2* | 3/2011 | Platzer et al. | | 345/473 |
| 7,958,456 B2* | 6/2011 | Ording et al. | | 715/784 |
| 8,006,192 B1* | 8/2011 | Reid et al. | | 715/762 |
| 8,423,914 B2* | 4/2013 | Louch et al. | | 715/860 |
| 8,656,311 B1* | 2/2014 | Harper et al. | | 715/854 |
| 9,129,088 B1* | 9/2015 | Baschy | | G06F 21/10 |
| 2002/0109668 A1* | 8/2002 | Rosenberg | | G05G 9/047 345/156 |
| 2003/0174160 A1* | 9/2003 | Deutscher et al. | | 345/716 |
| 2005/0044505 A1* | 2/2005 | Laney et al. | | 715/781 |
| 2005/0278585 A1* | 12/2005 | Spencer | | 714/46 |
| 2006/0066569 A1* | 3/2006 | Eid et al. | | 345/156 |
| 2006/0095846 A1* | 5/2006 | Nurmi | | G06F 3/016 715/701 |
| 2006/0221858 A1* | 10/2006 | Switzer et al. | | 370/254 |
| 2007/0044035 A1* | 2/2007 | Amadio et al. | | 715/781 |
| 2007/0050732 A1* | 3/2007 | Chapman et al. | | 715/810 |
| 2007/0058047 A1* | 3/2007 | Henty | | 348/211.99 |
| 2007/0061748 A1* | 3/2007 | Hirose | | 715/764 |
| 2007/0067328 A1 | 3/2007 | Mingot et al. | | |
| 2007/0146337 A1* | 6/2007 | Ording | | G06F 3/0485 345/173 |
| 2007/0150830 A1* | 6/2007 | Ording et al. | | 715/784 |
| 2007/0156677 A1* | 7/2007 | Szabo | | 707/5 |
| 2007/0252729 A1* | 11/2007 | Li et al. | | 341/22 |
| 2007/0263014 A1* | 11/2007 | Ketola et al. | | 345/684 |
| 2007/0263015 A1* | 11/2007 | Ketola et al. | | 345/684 |
| 2008/0066003 A1* | 3/2008 | Vong | | 715/763 |
| 2008/0068354 A1* | 3/2008 | Aimi et al. | | 345/184 |
| 2008/0129520 A1* | 6/2008 | Lee | | 340/636.1 |
| 2008/0168404 A1* | 7/2008 | Ording | | 715/863 |
| 2008/0168478 A1* | 7/2008 | Platzer et al. | | 719/328 |
| 2008/0220747 A1* | 9/2008 | Ashkenazi et al. | | 455/414.1 |
| 2008/0231611 A1* | 9/2008 | Bathiche et al. | | 345/175 |
| 2008/0307361 A1* | 12/2008 | Louch et al. | | 715/835 |
| 2008/0309632 A1* | 12/2008 | Westerman et al. | | 345/173 |
| 2009/0013254 A1* | 1/2009 | Walker et al. | | 715/727 |
| 2009/0013275 A1* | 1/2009 | May et al. | | 715/765 |
| 2009/0015559 A1* | 1/2009 | Day et al. | | 345/167 |
| 2010/0020022 A1* | 1/2010 | Russell et al. | | 345/173 |
| 2010/0184484 A1* | 7/2010 | Lindberg et al. | | 455/566 |
| 2010/0325575 A1* | 12/2010 | Platzer et al. | | 715/781 |
| 2011/0022985 A1* | 1/2011 | Ording et al. | | 715/830 |
| 2011/0141120 A1* | 6/2011 | Platzer et al. | | 345/473 |

FOREIGN PATENT DOCUMENTS

| | | |
|---|---|---|
| KR | 2000-0048329 A | 7/2000 |
| KR | 2002-0027892 A | 4/2002 |
| KR | 10-2005-0077606 A | 8/2005 |
| KR | 10-0685268 B1 | 2/2007 |

* cited by examiner

SCROLLING METHOD OF MOBILE TERMINAL

CROSS REFERENCE TO RELATED APPLICATIONS

The present application claims priority to Korean Application No. 10-2007-0089670 filed in Korea on Sep. 4, 2007 and Korean Application No. 10-2007-0089686 filed in Korea on Sep. 4, 2007, the entire contents of which is hereby incorporated by reference in its entirety.

BACKGROUND OF THE INVENTION

Field of the Invention

The present invention relates to a user interface of a mobile terminal having a touch pad.

Description of the Related Art

A mobile terminal is a device that can be carried around and has one or more functions such as to perform voice and video call communication, inputting and outputting of information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the mobile terminal requires sufficient support in terms of hardware or software, for which numerous attempts are being made and implemented. For example, a user interface (UI) environment is provided to allow users to easily and conveniently search and select functions.

Also, as users consider their mobile terminal to be a personal portable device that may express their personality, mobile terminals are demanded to have various designs.

In terms of design, a folder type, slide type, bar type, or rotation type design may be applied for mobile terminals, and efforts have been made to provide a more convenient UI to users.

SUMMARY OF THE INVENTION

Accordingly, one object of the present invention is to address the above-noted and other requirements.

Another object of the present invention is to provide a mobile terminal capable of providing to a user feedback upon reaching the end of a displayed menu list in a certain manner when the displayed menu list is scrolled according to a user manipulation, and a method for searching and providing feedback of a displayed menu.

To achieve these and other advantages and in accordance with the purpose of the present invention, as embodied and broadly described herein, the present invention provides in one aspect a mobile terminal including: a sensing unit able to sense a flicking input manipulation by a user; an output unit; and a controller able to move a displayed menu list according to the flicking input manipulation sensed by the sensing unit, and to output a certain feedback via the output unit when the last item of the displayed menu list appears.

To achieve these and other advantages and in accordance with the purpose of the present invention, as embodied and broadly described herein, the present invention provides in another aspect a scrolling method of a mobile terminal including: sensing a flicking input manipulation by a user; moving a displayed menu list according to the sensed flicking input manipulation; and outputting a certain feedback indicating reaching of the end of a displayed menu list when the last item of the displayed menu list appears.

To achieve these and other advantages and in accordance with the purpose of the present invention, as embodied and broadly described herein, the present invention provides in still another aspect a mobile terminal including: a manipulation unit; a display unit able to display a certain signal inputted via the manipulation unit; and a controller able to display a graphic effect on a certain region of a screen indicating the reaching of one end of a list displayed on the display unit when the displayed list is moved to the one end thereof.

To achieve these and other advantages and in accordance with the purpose of the present invention, as embodied and broadly described herein, the present invention provides in yet another aspect a mobile terminal including: a display unit available for a touch input; and a controller able to display a graphic effect on a certain region of a screen indicating the reaching of one end of a displayed list when the displayed list is moved to the one end thereof according to the touch input.

To achieve these and other advantages and in accordance with the purpose of the present invention, as embodied and broadly described herein, the present invention provides in another aspect a scrolling method of a mobile terminal including: sensing the inputting of a certain manipulation via an input unit; moving a displayed list to one end thereof according to the sensed manipulation input; and displaying a graphic effect on a certain region of a display screen when the list is moved to the one end thereof.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. It should be noted that 'module', 'part', and 'unit' can be substitutively, alternatively or mixedly used.

Figure 1:
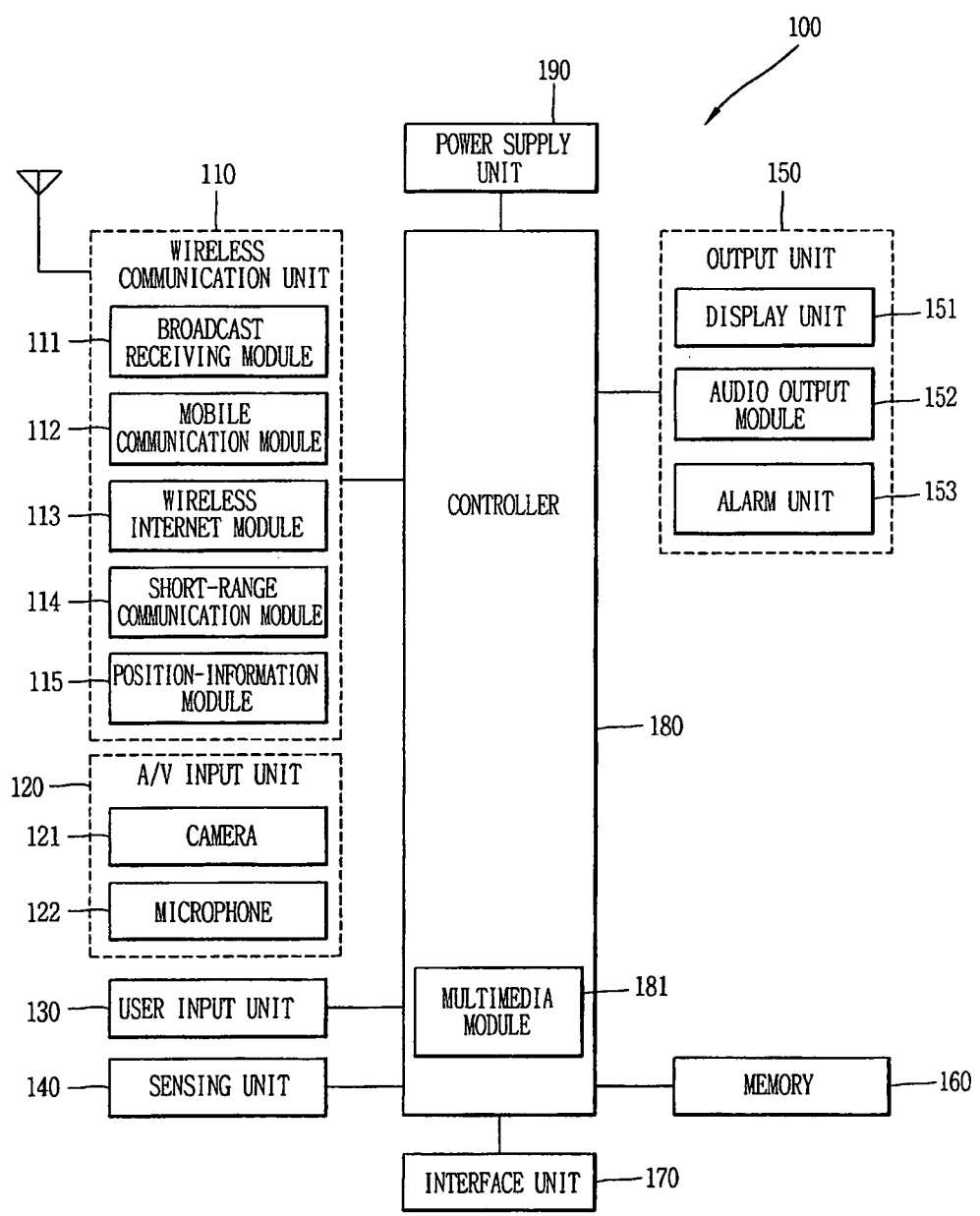
FIG. 1 is a schematic block diagram of a mobile terminal implementing an embodiment of the present invention.

FIG. 1 is a schematic block diagram of a mobile terminal implementing an embodiment of the present invention.

The mobile terminal may be implemented in various forms. For example, the described mobile terminal functionality may be implemented in portable devices such as mobile phones, smart phones, notebook computers, digital broadcast receivers, PDAs (Personal Digital Assistants), PMPs (Portable Multimedia Player), navigation devices, and the like, and in fixed type devices such as digital TVs, desktop computers, or the like. In the following description, a terminal is assumed to be a mobile terminal, but it would be understood by a person in the art that the present invention can be also applicable to the fixed types of terminals except for any elements especially configured for a mobile purpose.

The mobile terminal according to an embodiment of the present invention will now be described with reference to FIG. 1.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190.

FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. Examples of the broadcast associated information may include information regarding a broadcast channel, a broadcast program, a broadcast service provider, etc. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network (e.g., that operates according to standards such as 3GPP, 3GPP2, IEEE, CDMA, GSM, OMA, so-called 4G techniques, etc.) and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital signal broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 is configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted), a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the user touches the touch screen with his finger tip in a flicking manner to perform an operation of quickly moving a select menu (or a selection bar) or a cursor displayed thereon, the sensing unit 140 may sense the user's manipulation to generate a corresponding sense signal.

Also, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141, which will be described in association with the touch screen.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating a user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. Atypical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit and an internal display unit.

The touch screen may be configured to detect a touch input pressure as well as a touch input position and a touch input area. The touch screen may detect a user's touch and manipulation such as dragging, scrolling, flicking, or the like by interworking with the sensing unit 140.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been inputted or which are to be outputted. In addition, the memory 160 may store data regarding various patterns of vibrations and audio signals to be outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3.

The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
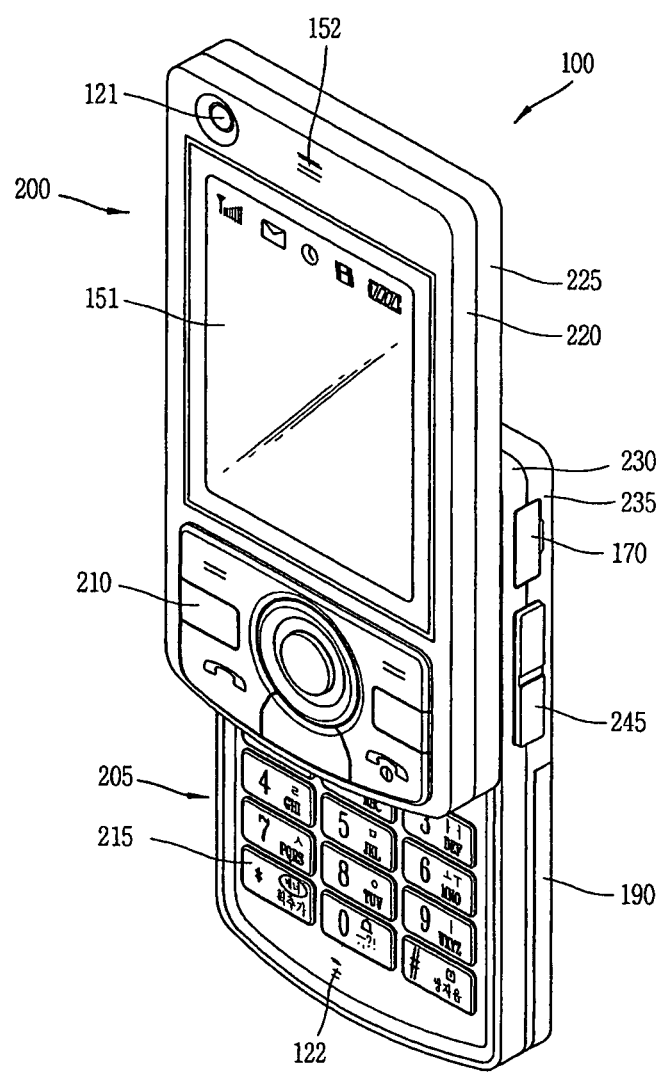
FIG. 2 is a front perspective view of a mobile terminal implementing an embodiment of the present invention.

FIG. 2 is a front perspective view of the mobile terminal according to an embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body is disposed to overlap with the second body 205 may be called a closed configuration, and as shown in FIG. 2, a state in which at least a portion of the second body 205 is exposed may be called an open configuration.

Although not shown, the mobile terminal according to the present invention may be the folder type mobile terminal including the first body and the second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily know by the person in the art without any explanation, so its detailed description will be omitted.

In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body, 200, specifically, on the first front case 220 of the first body 200.

The display unit 151 may include an LCD (Liquid Crystal Display), an OLED (Organic Light Emitting Diode), and the like, that visually displays information.

A touch pad may be overlaid in a layered manner on the display unit 151 to allow the display unit 151 to function as a touch screen to input information via user gestures or touch inputs.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. For example, the interface unit 170 may be implemented in the form of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like.

Also, the interface unit 170 may be a card socket for accommodating a SIM (Subscriber Identification Module) card or a UIM (User Identity Module) card, or an external card such as a memory card for storing information.

The power supply unit 190 for supplying power to the terminal may be located at the second rear case 235.

The power supply unit 190 may be, for example, a rechargeable battery that can be detached.

Figure 3:
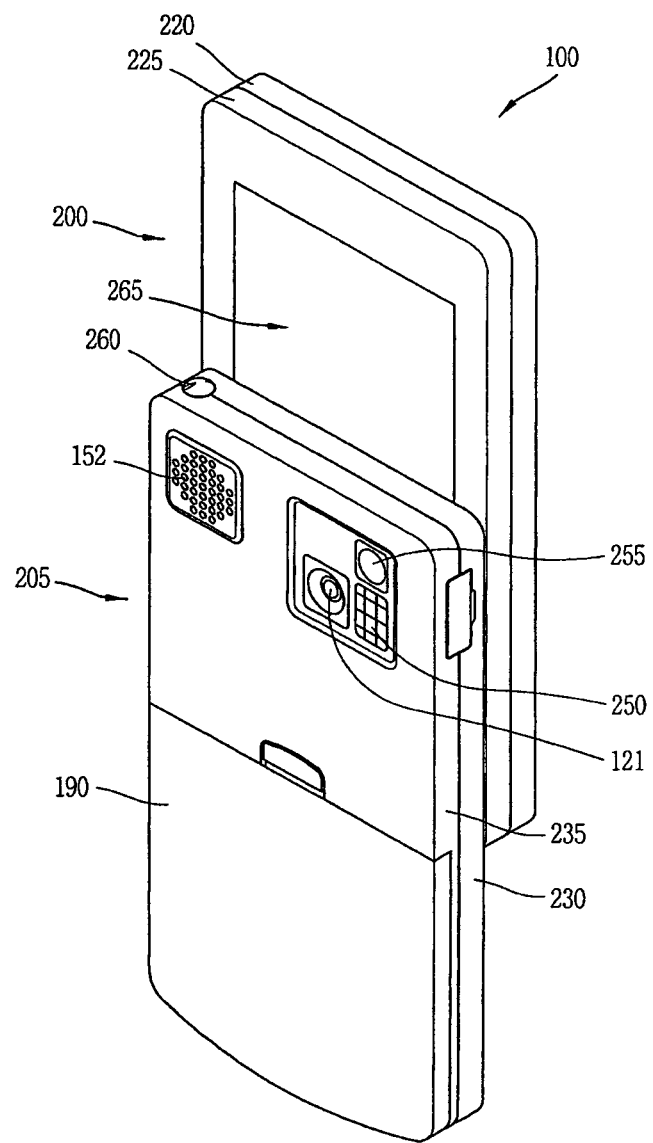
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing, The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
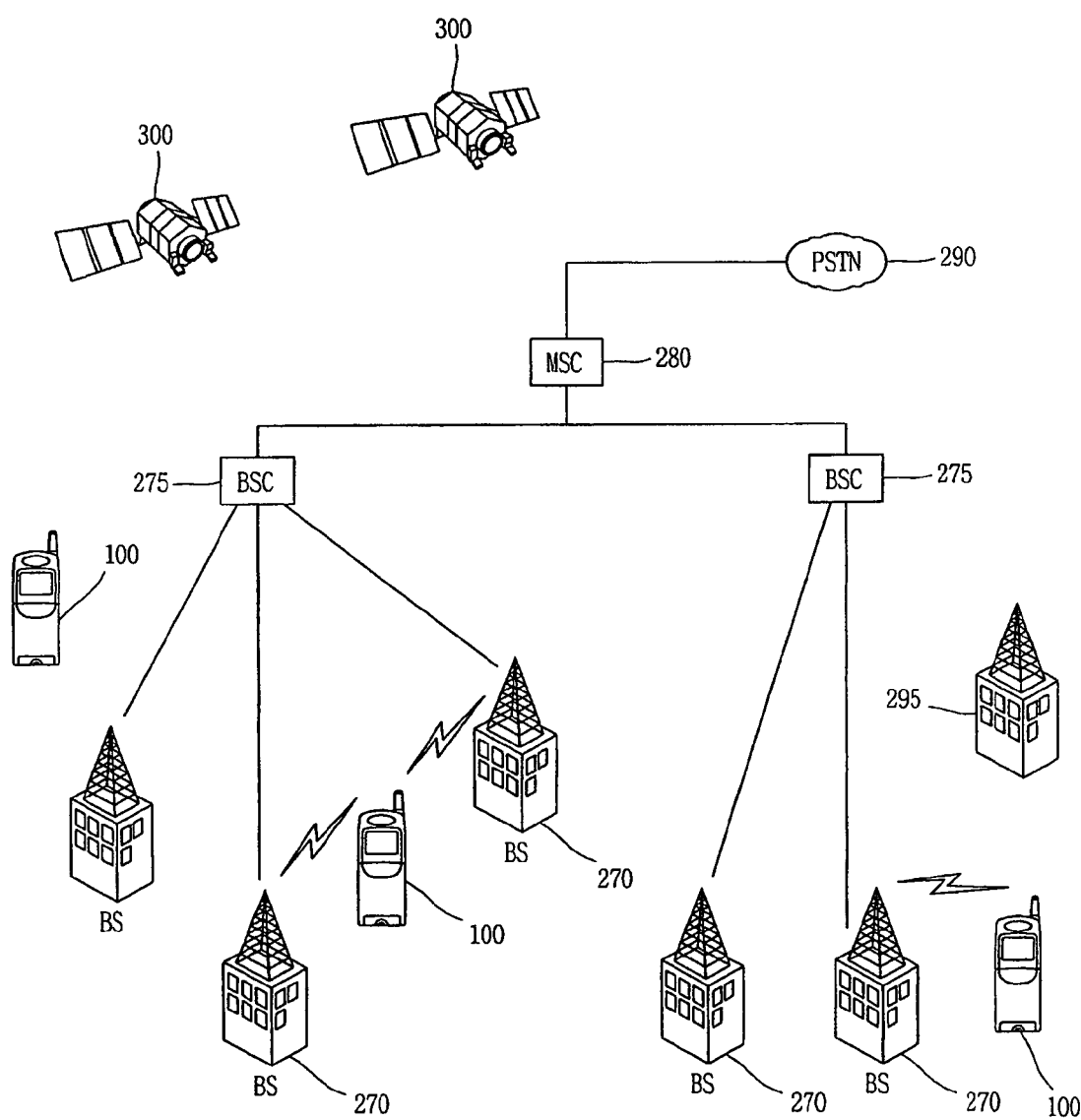
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100.

In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information.

Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270.

The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Figure 5:
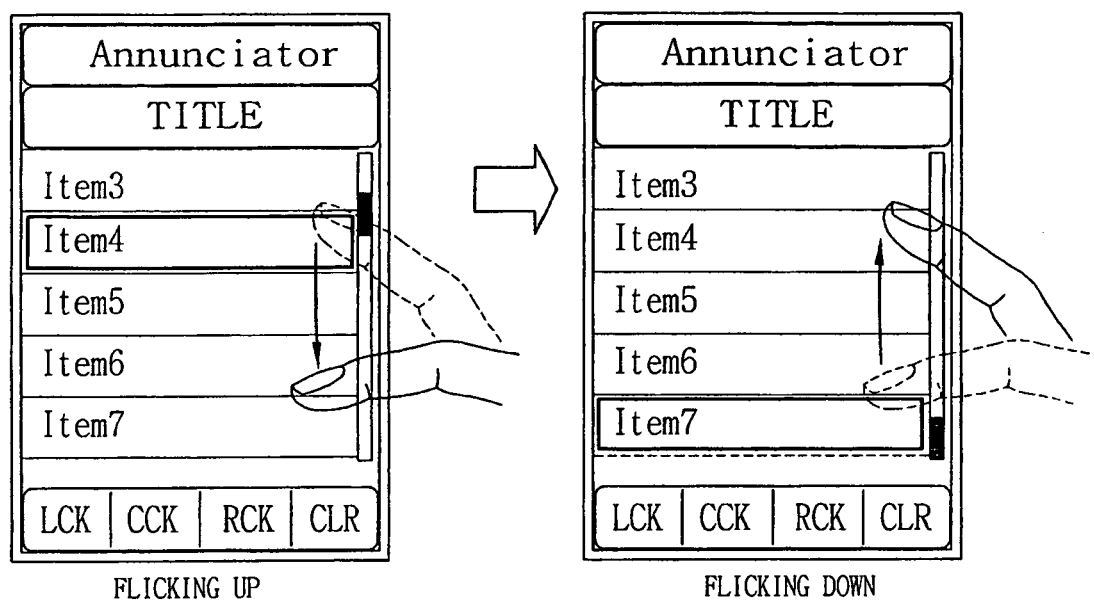
FIG. 5 is a view of a screen displayed explaining a flicking manipulation touch input and resultant display of a menu performed on a touch screen of the mobile terminal in accordance with the present invention.

FIG. 5 is a view of a screen display or explaining how a flicking is performed on the touch screen of the mobile terminal.

As shown in FIG. 5, a flicking, which is a user operation discriminated from dragging, means a user's touching on the touch screen in a flicking manner to quickly move a displayed menu list (or a selection bar) or a cursor. Because the displayed menu list can be moved up and down through flicking, the user can conveniently search for a desired menu item (e.g., content item 7). Thus, the flicking may be called a fast scrolling operation.

An acceleration mechanism (or acceleration movement technique) is applied for the movement of the displayed menu list by the flicking. The acceleration movement technique refers to an animation (or a motion graphic image) technique in which the law of physical motion acceleration and deceleration is applied to the depiction of a movement of a particular object to provide a realistic imagery in implementing a GUI.

The depicted acceleration movement of the displayed menu list (or selection bar) or the cursor is proportional to the force and speed of the user manipulation applied to the corresponding displayed menu list. Namely, when the user performs flicking, the movement speed of the displayed menu list is determined in consideration of a sensed distance, pressure, speed, etc., of the flicking.

Typically, the user moves to a desired position of the displayed menu list by a slight touch or drag, and if there are tens of or hundreds of content items in the menu list and the user wants to quickly move to a desired position of the menu list, the user may flick at the displayed menu list with an appropriate force and speed to quickly move to the desired position.

In this respect, however, although the user may believe that he has flicked the menu list with an appropriate force and speed, he may not reach the last item of displayed the menu list, or he may reach the last item of the menu list with such a strong acceleration movement as to pass beyond a lower end of the screen display because of an excessive force or speed.

Figure 6:
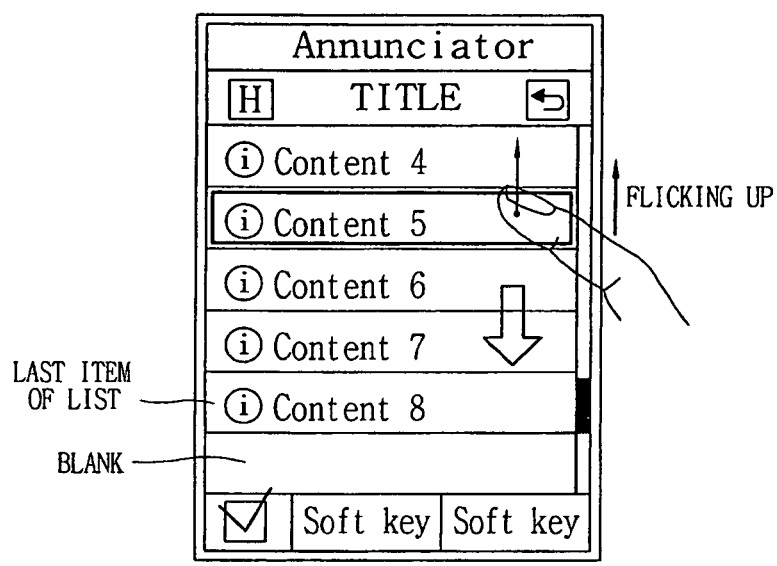
FIG. 6 is a view of a screen display showing a first example of a visual feedback method with respect to the reaching of the end of a displayed menu list in a flicking operation.

FIG. 6 shows an example of a visual feedback method with respect to reaching the end of the displayed menu list in performing flicking according to the present invention.

As shown in FIG. 6, in accordance with the present invention, when the user reaches the last item of the flicked menu list (or contents list), certain blank spaces are provided at both ends of the list. Namely, a certain blank space is provided between the last content item of the menu list and the lower end of the screen to allow the user to recognize that the last content item of the list is displayed.

Alternatively, a picture or a discriminated color region may be displayed at both ends of the list.

Figure 7:
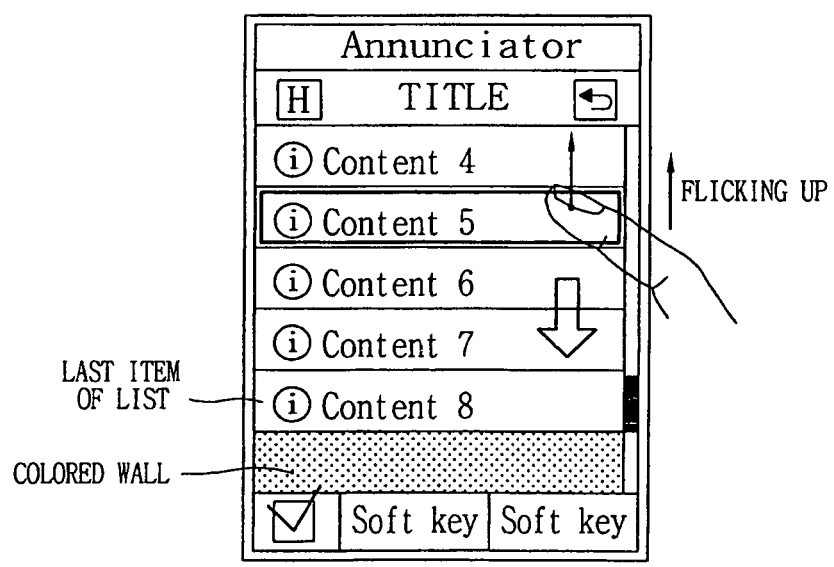
FIG. 7 is a view of a screen display showing a second example of a visual feedback method with respect to the reading of the end of a displayed menu list in a flicking operation.

FIG. 7 shows another example of a visual feedback method with respect to the reaching of the end of the displayed menu list in a flicking operation according to the present invention.

In the present invention, a border of a certain color is displayed at a certain boundary contiguous with edge of, i.e., beyond, the last item of the menu list, namely, contiguous with the selection list, so that when the user reaches the last content item of the flicked menu list (or contents list) through an acceleration movement of a certain speed or faster, the user can visually recognize that it's the last item being displayed.

In addition, in the present invention, both the blank space as depicted in FIG. 6 and the border as depicted in FIG. 7 may be displayed to increase the recognition effect of reaching the end of the displayed menu list.

Figure 8:
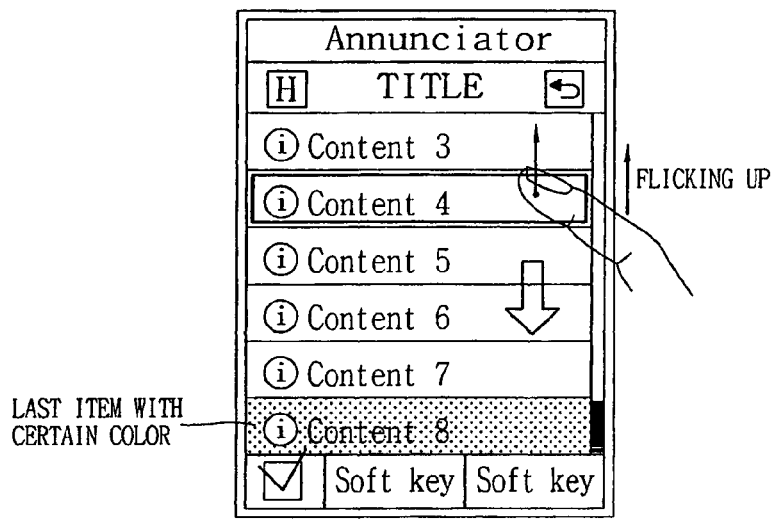
FIG. 8 is a view of a screen display showing a third example of a visual feedback method with respect to the reaching of the end of a displayed menu list in a flicking operation.

FIG. 8 shows still another example of a visual feedback method with respect to reaching the end of the displayed menu list in a flicking operation.

As shown in FIG. 8, the last item on the displayed menu list is discriminately displayed. Namely, the last item of the list may be colored or the color of an item adjacent to the last item on the list may be changed to inform the user about the end of the menu list.

When the user moves between the items (contents) on the displayed menu list by using flicking to search, i.e., scroll, through the plurality of contents displayed on the menu list, the reaching of the end of the displayed menu list can be visually informed.

In addition, when the user moves, i.e., scrolls, between the items on the displayed menu list by using flicking to search through the plurality of contents on the displayed menu list, the reaching of the end of the menu list can be audibly informed.

Namely, when the user reaches the last item in the displayed menu list (or contents list) through an acceleration movement faster than a certain speed, in the present invention, a certain sound is outputted as an audible feedback indication with respect to the reaching of the end of the menu list by using the alarm unit 153 or the audio output module 152 to audibly inform the user accordingly. Preferably, the sound may include a voice, a mechanical sound, an intermittent sound or a continuous sound. The voice may be, for example, an announcement such as 'It's the last item of the list', and the sound may be 'ting' or a general alarm sound. The intermittent sound is a sound which is generated one time and then terminated, such as a 'ting'. The continuous sound refers to a sound form which is generated at an early stage of flicking and terminated upon reaching the last item of the menu list (or contents list). Namely, a sound, for example, a frictional sound, may be generated when each displayed item of the menu list frictionally contacts with a bar 410 of a certain form or a rotational plate 420.

Figure 9:
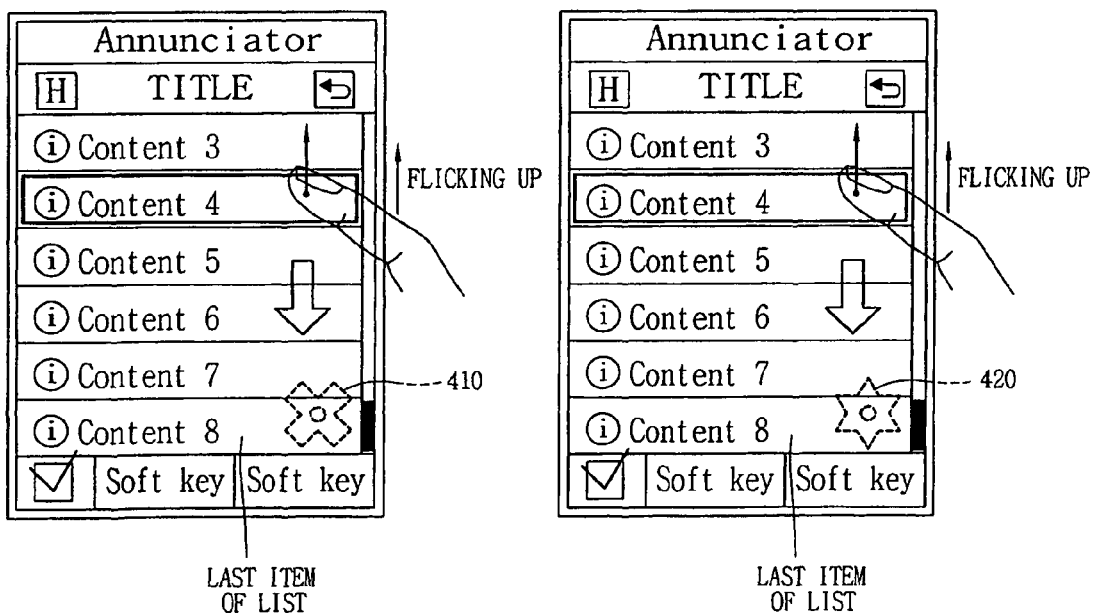
FIG. 9 is a view of a screen display showing an example of an audible feedback method with respect to the reaching of the end of a displayed menu list in a flicking operation.

FIG. 9 is a view showing an example of an audible feedback method with respect to the reaching of the end of a displayed menu list in a flicking operation. For example, reaching of the end of the menu list is indicated by generating a continuous sound. FIG. 9 shows the two types of patterns 410 and 420 contacting with the plurality of items on the menu list, but the present invention is not limited thereto, and various shapes may be applicable.

In the present invention, feedback indication with respect to the reaching of end of the menu list may be made in a tactile manner as well as in the visual or audible manner as described above. Namely, when the last item of the flicked menu list is reached through an acceleration movement of a certain speed or faster, in the present invention, a vibration may be outputted as a feedback indication with respect to the end of the menu list by using the alarm unit 153 of the output unit 150.

Figure 10:
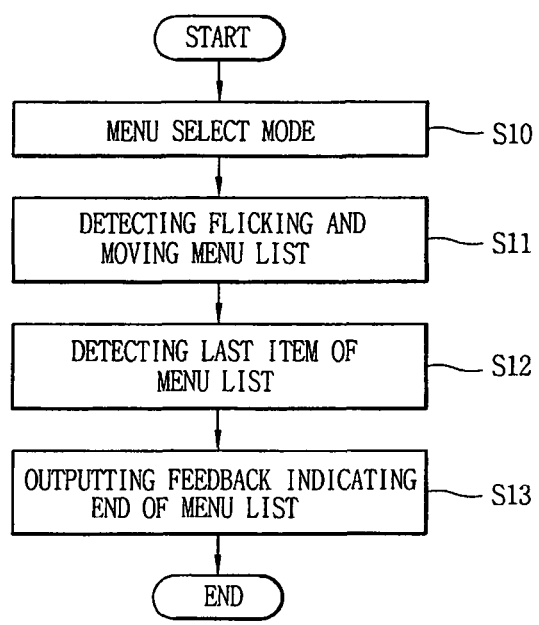
FIG. 10 is a flow chart illustrating the process of a menu search feedback method according to an embodiment of the present invention.

FIG. 10 is a flow chart illustrating the process of a menu search feedback method according to an embodiment of the present invention;

As shown in FIG. 10, when the user enters a menu select mode by using the manipulating portion 130, the controller 180 reads the contents menu list from the memory 160 and outputs it to the output unit 150 to display a plurality of items of the menu list on the display unit 151 (S10).

In this state, the user may select a desired item on the menu list through a light touch or drag, or may quickly move to a different item on the menu list through flicking. If the user perform flicking, the sensing unit 140 detects the force and speed of the flicking and outputs corresponding information to the controller 180.

The controller 180 detects whether or not a flicking has been generated based on the touch, force and speed detected by the sensing unit 140, and moves the displayed menu list in a corresponding direction according to the detected force and speed (S11).

While the displayed menu list is being moved, the controller 180 checks whether the last item of the menu list is displayed on the screen. When the last item of the menu list is displayed, the controller 180 outputs a feedback to the user indicating that the last item of the menu list has been reached (S13). Preferably, the feedback is outputted by audio, video or vibration when a portion or the entirety of the end of the menu list is displayed.

Figure 11:
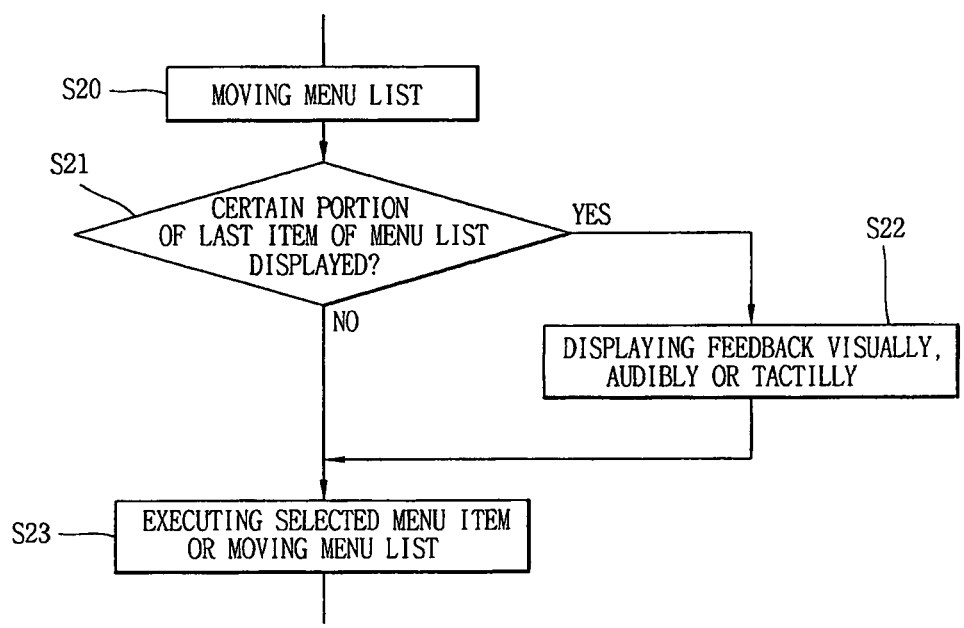
FIG. 11 is a flow chart illustrating the process of a feedback output routing for indicating the end of a menu list in the process in FIG. 10.

FIG. 11 is a flow chart illustrating the process of a feedback output indicating the reaching of the end of the menu list in the menu search method in FIG. 10.

As shown in FIG. 11, the controller 180 moves the displayed menu list in accordance with the force and speed detected by the sensing unit 140 (S20), and checks whether or not a certain portion of the last item of the menu list is displayed (S21).

If a certain portion of the last item of the menu list is displayed, the controller 180 controls one or more of the display unit 151, the audio output module 152 and the alarm unit 153 to output a feedback indication for indicating to the user that the end of the menu list has been reached in a visual, audible and tactile (e.g., vibration) form (S22).

If a certain portion of the last item of the menu list is not displayed, the controller 180 may execute a user selected menu item or detect flicking by the user and moves the displayed menu list again (S23).

Figure 12:
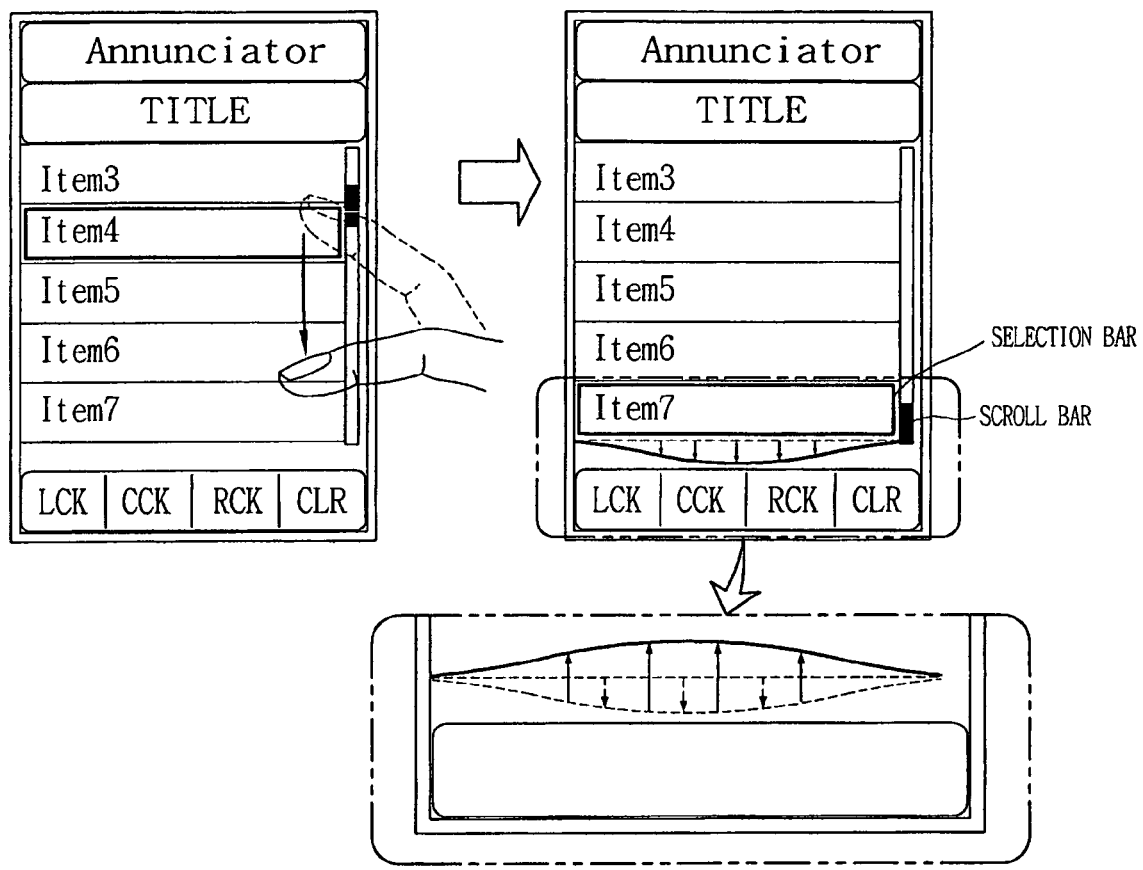
FIG. 12 depicts the displaying of a motion graphic image according to one embodiment of the present invention.

FIG. 12 depicts the display of a motion graphic image generated at a lower edge portion of a screen display when a displayed selection bar reaches the last item of the displayed contents list (or display list) according to a flicking by the user according to one embodiment of the present invention.

When the selection bar is intended to be moved to the last item (or a first item) of the displayed contents list quickly, the user may flick the displayed selection bar with a proper force and speed.

In this respect, however, although the user may believe that he has flicked the selection bar with an appropriate force and speed, the thusly flicked selection bar may reach the last item of the displayed list with such a strong acceleration movement as to pass beyond the lower edge of the screen display because of an excessive force or speed. FIG. 12 shows the case where the selection bar reaches the last item of the displayed list due to an acceleration movement faster than a certain speed.

As shown in FIG. 12, when the flicked selection bar reaches the last item of the displayed list, in the present invention, the boundary contiguous with the last item at the lower portion of the screen is implemented as a motion graphic image having a wavy or oscillating shape graphically depicting or simulating a reaction or collision with the selected bar. Through the motion graphic image, the user can visually recognize that there are no more items to be displayed on the list.

The waving is expressed as the motion graphic image providing a visual sensation that the selection bar collides with the boundary through an acceleration movement faster than a certain speed to cause an impact waveform to appear. The impact waveform according to the collision is processed to be strongest at the center of the boundary and weakens by degree toward both the left and right ends.

The size of the impact waveform (or waving) generated by the collision with the selection bar is proportional to the movement speed of the selection bar. The movement speed of the selection bar is determined by the distance, pressure and speed of a user touch detected on the touch screen.

FIG. 12 shows the motion graphic image generated at the lower end portion of the screen, but such a motion graphic image can also be displayed at an upper end portion of the screen. Namely, when the selection bar reaches a first item of the displayed contents list (or display list), a boundary contiguous with the first item at the upper portion of the screen display can be displayed as a motion graphic image having a wavy shape according to a collision with the selection bar. In addition, based on the same principle, when the selection bar reaches the left end or the right edge, such a motion graphic image can be displayed in the same manner.

Figure 13:
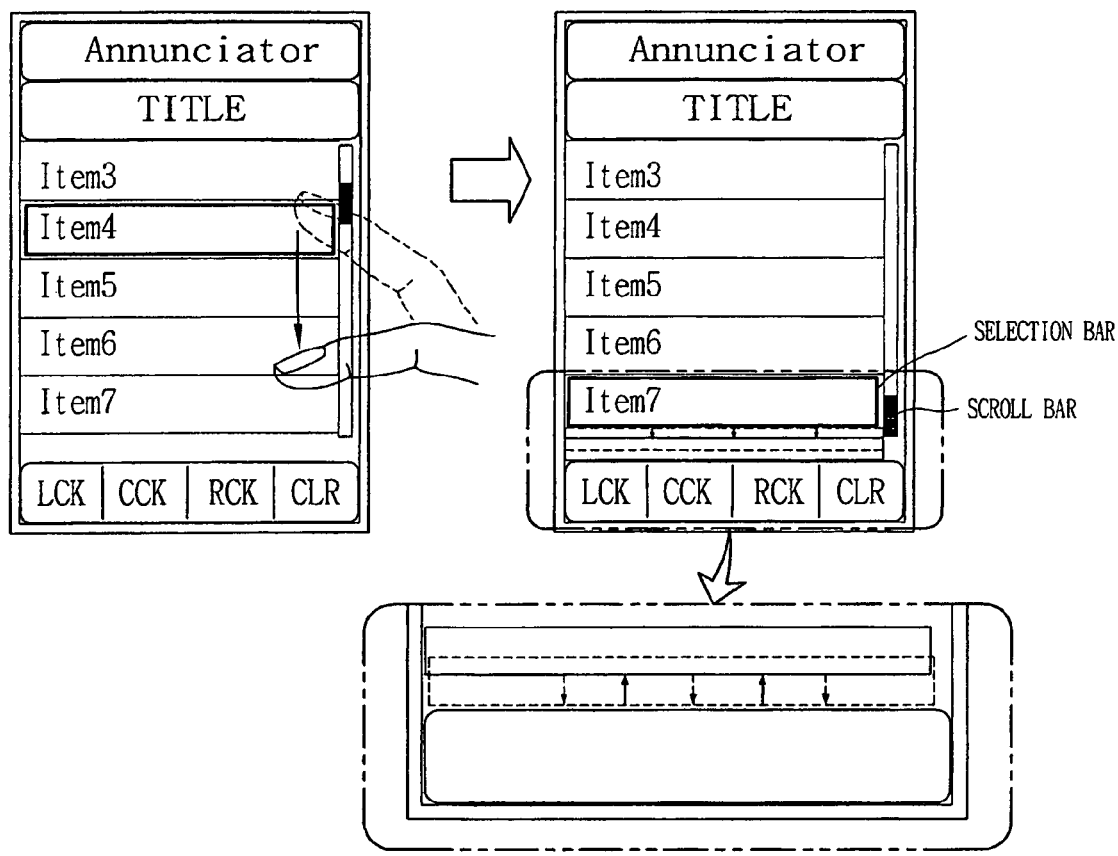
FIG. 13 depicts the displaying of a motion graphic image according to another embodiment of the present invention.

FIG. 13 depicts the displaying of a motion graphic image according to another embodiment of the present invention.

According to the embodiment as shown in FIG. 13, when the flicked selection bar reaches the last item of the displayed contents list, a motion graphic image display effect may be implemented such that a certain displayed boundary contiguous with the selection bar at a lower portion of the screen is thrust as it collides with the selection bar.

When the certain boundary collides with the selection bar, it is displayed so as to depict that it moves such that it is thrust down temporarily and then returns to its original position like an impact buffering unit (bumper). The thrust can results in the boundary moving a constant amount across its entire length, as seen in the dashed lines of FIG. 13. The thrust degree of the boundary due to the collision with the selection bar is proportional to the movement speed of the displayed selection bar.

Such a motion graphic image as shown in FIG. 13 may be also displayed in the same manner when the selection bar reaches a first item of the contents list (or the display list). In addition, based on the same principle, when the selection bar reaches the left end or the right edge, such a motion graphic image can be displayed in the same manner.

In a different embodiment, when the certain boundary collides with the selection bar, a motion graphic image may be implemented such as to graphically depict that the boundary is temporarily compressed or contracted and then returns or expands to its original shape like a rebounding of an impact buffering member (e.g., a rubber material, etc.) with elasticity. In this case, the displayed selection bar immediately after the collision has a movement effect as if a ball bounces on the floor, on the certain boundary. An accompanying sound effect, such as a 'boing' sound, or a vibration, may be generated and outputted to audibly or tactilly reinforce the visual effect.

In the present invention, when the flicked displayed selection bar makes an acceleration movement of a certain speed or faster, the motion graphic image can be displayed. In this case, the motion graphic images as shown in FIGS. 12 and 13 will be displayed when the flicked selection bar reaches the last item of the contents list through the acceleration movement at the certain speed or faster.

In the embodiments according to the present invention as shown in FIGS. 12 and 13, the operation of controlling the movement of the selection bar (or cursor) according to an input (e.g., dragging, scrolling, flicking, etc.) through a touch screen has been described. However, without being limited thereto, the motion graphic effect according to the present invention can also be applied in the same manner even when the movement of the selection bar (or the cursor) is controlled through the manipulation portion 130 as well as by input through the touch screen.

Figure 14A:
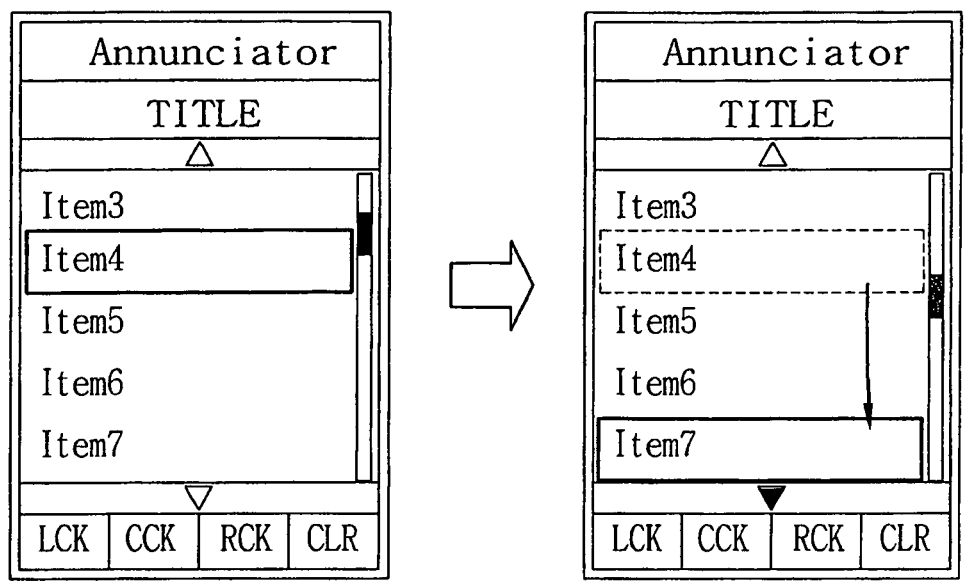
FIG. 14A and FIG. 14B show a screen image of a contents list according to one embodiment of the present invention.
Figure 14B:
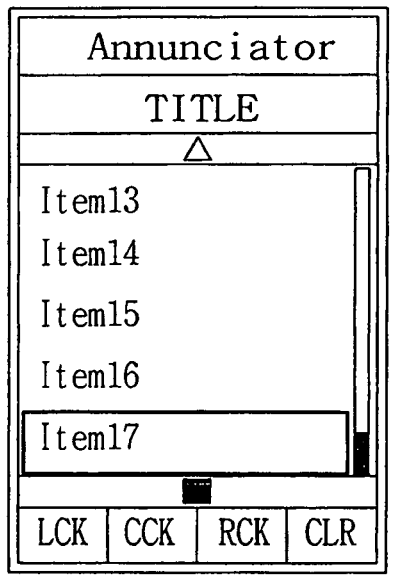

FIGS. 14A and 14B depict a screen display image of a contents list according to one embodiment of the present invention, in which directional symbols are displayed at upper and lower end portions of the displayed contents list.

In the present invention, if the number of the entire items of the contents list exceeds the number of the contents that can be displayed on a single screen, as shown in FIG. 14A, a directional symbol (e.g., arrows (↑, ↓), triangles (□, □), etc.) can be displayed for indicating that there are remaining undisplayed items in the contents list.

When the directional symbols (e.g., the arrow (↑), the triangle (□), etc.) are displayed at the upper end portion of the contents list screen image, it means that there are more items of preceding order, beyond an upper edge of the screen, than the contents of the displayed list appearing on the screen. If the directional symbols (e.g., the arrow (↓), the triangle (□), etc.) are displayed at a lower end portion of the contents list screen display, it means that there are more undisplayed items of succeeding order, beyond the lower edge of the screen, than the contents of the displayed list appearing on the screen.

The directional symbols displayed at the upper or lower end portions of the screen display may change according to the movement direction of the selection bar. For example, as shown in FIG. 14A, when the selection bar is moved downwardly, the directional symbol displayed at the lower portion of the screen changes (e.g., by color change, highlighting effect, blinking effect, effect of march of ants, neon sign effect, etc.). Likewise, when the selection bar is moved upwardly, the directional symbol displayed at the upper end portion of the screen changes.

Such changes in the directional symbols allow the user to conveniently and intuitively manipulate the terminal and increase the user's convenience in terminal manipulation.

If the last item of the contents list appears on the screen, the directional symbol displayed at the lower end portion (or upper end portion) of the screen may be changed into a different shape, namely, a non-directional symbol (e.g., a square (■ or □), a lozenge (□ or □), or a circle (● or ○) as shown in FIG. 14B, through which the user can recognize whether or not the selection bar has reached the first item or the last item of the contents list.

If there is a small number of items in the contents list so they can all be displayed on a single screen image, the directional symbols may be displayed on the screen, or the non-directional symbols (e.g., the square (0 or □), the lozenge (□ or □), the circle (● or ○), etc.) may be displayed instead of the directional symbols.

Figure 15A:
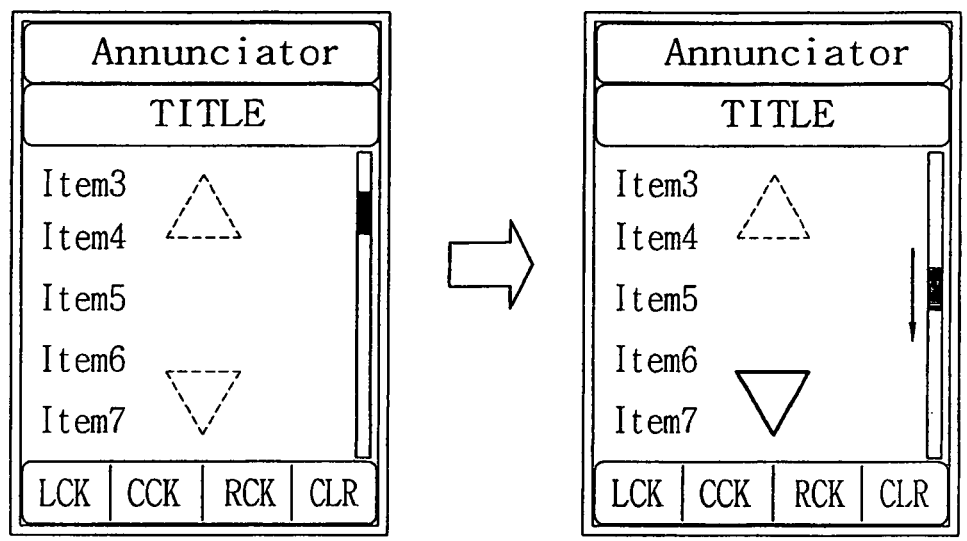
FIG. 15A and FIG. 15B show a screen image of a contents list according to another embodiment of the present invention.
Figure 15B:
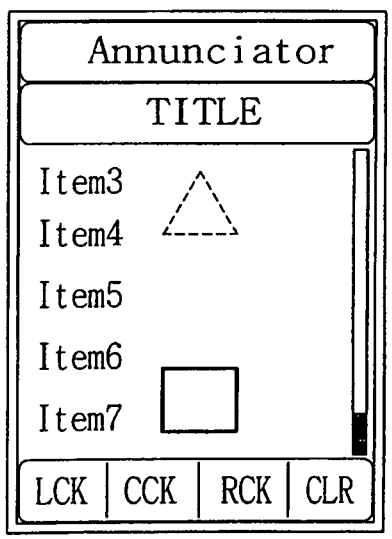

FIGS. 15A and 15B depict a screen image of a contents list according to another embodiment of the present invention.

In this embodiment, if the entire number of the items of the contents list exceeds the number of items that can be displayed on a single screen, a translucent directional symbol (e.g., arrows (↑, ↓), triangles (□, □), etc.) indicating that there are remaining undisplayed items in the contents list is displayed at one side of the contents list as shown in FIG. 15A.

And as mentioned above with reference to FIGS. 14A and 14B, the directional symbol displayed at one portion of the screen is changed (e.g., by color change, highlighting, blinking, march of ants effect, neon sign effect, etc.) according to the movement direction (upwardly or downwardly) of the scroll bar.

In addition, when the selection bar reaches the first item or the last item of the contents list, the directional symbol displayed at the upper or lower end portions of the screen can be changed into different translucent shapes (e.g., the square (● or □), the lozenge (□ or □), or the circle (● or ○), etc.) as shown in FIG. 15B, through which the user can recognize whether or not the selection bar has reached the first item or the last item of the contents list.

As shown in FIGS. 14A, 14B, 15A, and 15B, both the directional symbol and the scroll bar can be displayed on the single screen, but the movement situation of the selection bar can also be displayed only with the directional symbols.

The below table shows the movement directions of a page and that of the scroll bar according to flicking.

TABLE

Flicking directions: ↓, ↑
Movement directions of page: ↑, ↓
Movement directions of scroll bar: ↑, ↓
Positions of selection bar (or cursor): upper end of screen, lower end of screen In this manner, when the user quickly moves to a different item of a displayed menu list through flicking, the feedback indication for indicating the reaching of the end of the menu list can be outputted. The above-described embodiments may be implemented into fabrication methods, devices or products by using a reference programming and/or engineering technique to produce software, firmware, hardware or their combinations. Here, the term 'product' as used herein refers to codes or logic implemented in hardware logic (e.g., FPGA, ASIC, etc.), a computer-readable medium (e.g., magnetic storage medium (e.g., a hard disk drive, a floppy disk, a tape, etc.), an optical memory (CD-ROMs, optical disk, etc.), and volatile/non-volatile memory unit (e.g., EEPROMs, ROMs, PROMs, RAMs, DRAMs, SRAMs, firmware, programmable logic, etc.). The codes within the computer-readable medium can be accessed and executed by a processor.

The codes implemented according to the embodiments of the present invention can be accessible from transmission media or a file server of a network. In this case, the code-implemented product may include a network transmission line, wireless transmission media, and a transmission media such as signals, radio waves, or infrared signals transmitted via the space. Of course, such configuration can be variably modified without departing from the scope of the present invention and the product can be configured with an information bearing medium well known in the related art by the ordinary person in the art.

The present invention is not limited to the slide type mobile terminal as shown in FIG. 1 but can be applicable to various types of mobile terminals such as bar type, folder type and swing type mobile terminals, and the like.

As so far described, the scrolling method of a mobile terminal according to the present invention has the following advantages.

That is, when the displayed menu list movement is performed according to a flicking operation in a user interface environment of the mobile terminal having the touch screen or the touch pad, the feedback for indicating the reaching of the end (the last item) of the menu list can be provided to the user, so the practicality of the terminal manipulation and the user convenience of menu searching can be enhanced.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a touchscreen; and
a controller configured to:
display a list including a plurality of items on a region of the touchscreen,
receive a flicking touch input on the displayed list,
display a motion graphic image indicating a collision between an end item in the list and a boundary of the region in response to the flicking touch input to scroll the displayed list upwardly or downwardly,
wherein the motion graphic image includes a wave moving past the boundary of the region in a direction of the flicking touch input while the end item in the list is maintained at the boundary of the region, and
wherein an amount of the wave that moves past the boundary is proportional to a speed of the flicking touch input.

2. A scrolling method of a mobile terminal comprising:
displaying a list including a plurality of items on a region of a touchscreen of the mobile terminal;
receiving, via a controller of the mobile terminal, a flicking touch input on the displayed list; and
displaying a motion graphic image indicating a collision between an end item in the list and a boundary of the region in response to the flicking touch input to scroll the displayed list upwardly or downwardly,
wherein the motion graphic image includes a wave moving past the boundary of the region in a direction of the flicking touch input while the end item in the list is maintained at the boundary of the region, and
wherein an amount of the wave that moves past the boundary is proportional to a speed of the flicking touch input.

3. The mobile terminal of claim 1, wherein
a central portion of the wave moves past the boundary and the at least one end of the wave is maintained at the boundary.

4. The method of claim 2,
wherein a central portion of the wave moves past the boundary and the at least one end of the wave is maintained at the boundary.

5. The mobile terminal of claim 1, wherein the controller is configured to provide an audible feedback indicating the collision between the end item in the list and the boundary of the region.

6. The method of claim 2, further comprising providing an audible feedback indicating the collision between the end item in the list and the boundary of the region.

7. The mobile terminal of claim 1, wherein the controller is configured to provide a tactile feedback indicating the collision between the end item in the list and the boundary of the region.

8. The method of claim 2, further comprising providing a tactile feedback indicating the collision between the end item in the list and the boundary of the region.

9. The mobile terminal of claim 1, wherein the controller is further configured to display a directional symbol indicating a direction of scrolling of the displayed list, and
wherein the direction symbol changes appearance in response to the displayed list being scrolled to the end item.

10. The mobile terminal of claim 9, wherein the directional symbol changes to a non-directional symbol.

11. The mobile terminal of claim 9, wherein the directional symbol changes shape.

12. The method of claim 2, further comprising:
displaying a directional symbol indicating a direction of scrolling of the displayed list; and
changing an appearance of the direction symbol in response to the displayed list being scrolled to the end item.

13. The method of claim 12, wherein the directional symbol changes to a non-directional symbol.

14. The method of claim 13, wherein the directional symbol changes shape.

* * * * *